United States Patent [19]

Weitzman

[11] 4,004,719
[45] Jan. 25, 1977

[54] SLIDE DISPENSER APPARATUS

[76] Inventor: Lane T. Weitzman, 4647 Park Mirasol, Calabasas, Calif. 91302

[22] Filed: Aug. 14, 1975

[21] Appl. No.: 604,892

[52] U.S. Cl. .............................. 222/366; 141/373; 221/264; 222/288; 222/361
[51] Int. Cl.² ........................................ G01F 11/10
[58] Field of Search .......................... 141/108–111, 141/358, 371, 373; 221/255, 256, 266, 233, 264; 222/288, 361, 366, 363, 217; 194/93, 63

[56] References Cited
UNITED STATES PATENTS

| | | | |
|---|---|---|---|
| 1,066,753 | 7/1913 | Rast | 222/361 X |
| 2,083,135 | 6/1937 | Agerell et al. | 222/366 |
| 2,129,185 | 9/1938 | Simmons | 194/93 UX |
| 2,505,697 | 4/1950 | Vomalka | 222/361 |
| 3,010,557 | 11/1961 | Weitzman | 194/63 |

Primary Examiner—Robert B. Reeves
Assistant Examiner—David A. Scherbel
Attorney, Agent, or Firm—Gardner and Anten

[57] ABSTRACT

Slide dispenser apparatus comprising a manually operable, controlled-quantity merchandise dispenser of a type including a base and a separable upper merchandise-storing chamber positioned thereover and having a bottom opening for merchandise gravity-feeding relationship with respect to an upwardly open, intermediately positioned, merchandise-receiving-and-dispensing chamber positioned between the bottom of the merchandise-storing chamber and the underlying base, and with said intermediate chamber being provided with a manually-extendible-and-retractable merchandise-receiving-and-dispensing slide member having an upwardly open merchandise-receiving cavity of a size such as to receive a desired quantity of particulate merchandise material, or a unit of globular merchandise material, or the like, completely within the cavity for slidable transverse extending movement of the slide member into a position such that the cavity will be exterior of the base for dispensing the particulate material from a spoon carried by the slide member or directly through the bottom of the cavity into a person's hand or any suitable merchandise receiver.

8 Claims, 13 Drawing Figures

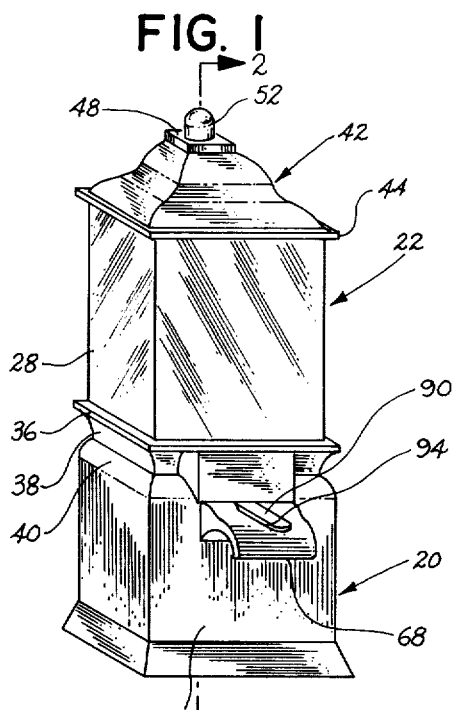
FIG. 1
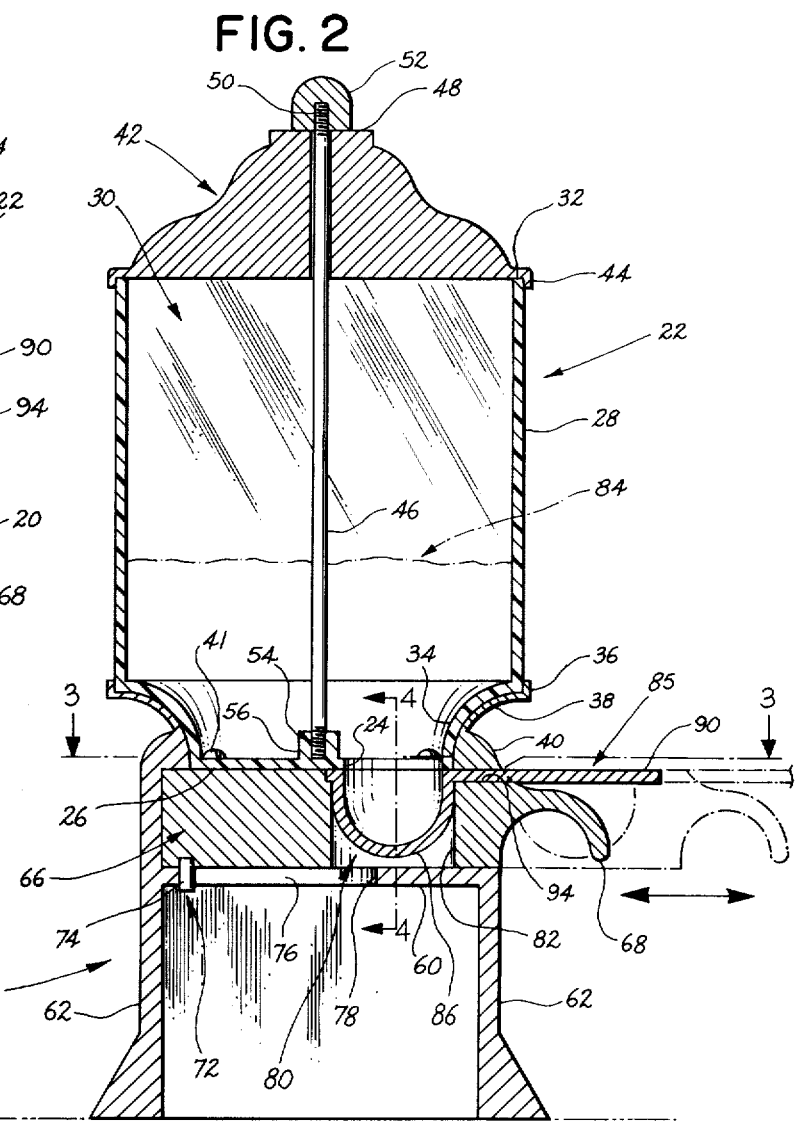
FIG. 2
FIG. 3
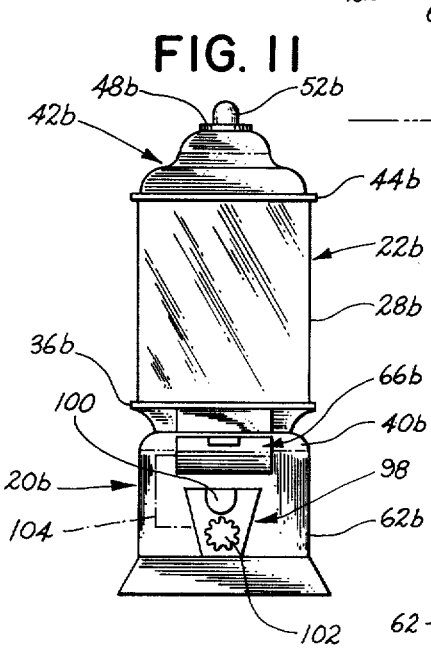
FIG. 11
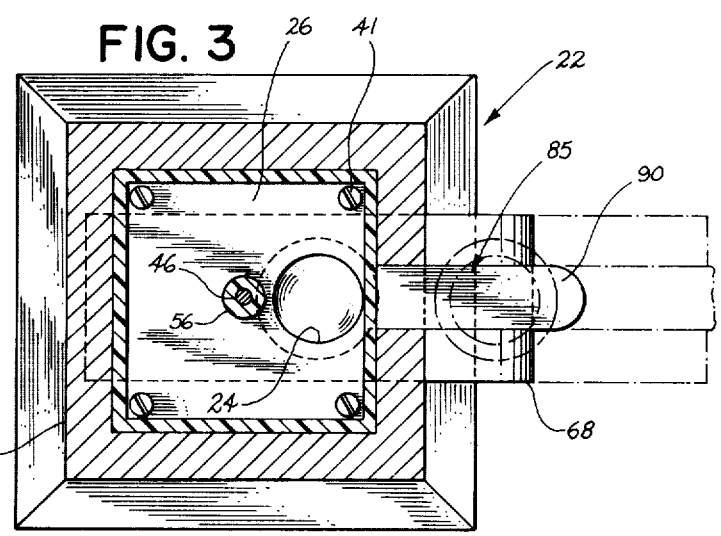

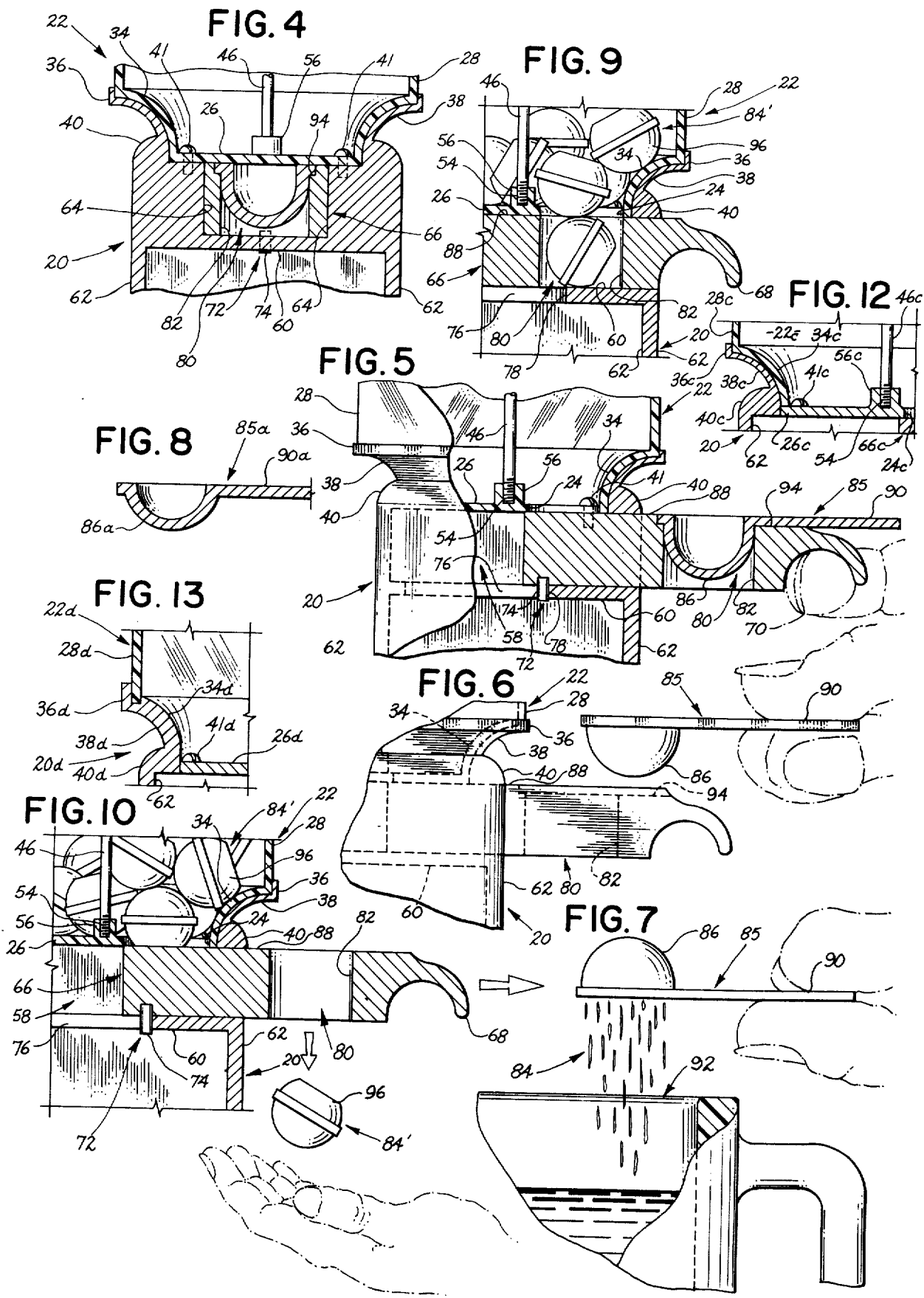

SLIDE DISPENSER APPARATUS

BACKGROUND OF THE INVENTION

The field of the invention is generally that of vending machines for merchandise dispensers and, more particularly, such a vending machine for particulate material, such as coffee, tea, powdered milk, cocoa, or any particulate material which it is desired to dispense in a measured quantity. It would be desirable to have a relatively inexpensive, simple machine of this type which would be employed in offices, factories, and various places of work where workers or groups of people congregate and where it may be desired to prepare coffee, tea, cocoa, or the like, easily by dispensing the desired particulate material into a cup or the like and to add either hot or cold water to prepare the desired beverage. In such offices and places of work, it is not desired that a large, complex, and expensive vending machine of the conventional prior art type be employed but, rather, a relatively, small, simple, and inexpensive and easy-to-operate machine, and it is precisely these objectives which are obtained in and through the use of the novel slide action dispenser of the present invention by reason of the novel features of the present invention as set forth hereinafter.

SUMMARY OF THE INVENTION

Generally speaking, the novel slide dispenser apparatus of the present invention takes the form of an upper chamber for the mercandise, a lower base removably supporting the upper merchandise chamber and adapted to, either rest upon a horizontal supporting surface, or be attached to, or mounted on, any appropriate stand or the like. The central junction region where the base supports the upper merchandise chamber is provided with a structure defining between the merchandise chamber and the base, what might be termed an upwardly open, intermediate merchandise-receiving-and-dispensing chamber positioned below a bottom opening in a gravity-discharging portion of the merchandise chamber. The intermediate chamber is provided with a laterally directed slideway means carrying therein a transversely or laterally extendible and retractable merchandise-receiving-and-dispensing slide member which can be moved between a fully-inserted position and an outwardly extended, substantially largely externally positioned relationship. The slide member is provided with an upwardly directed, downwardly recessed, merchandise-receiving cavity adapted to receive a predetermined quantity of merchandise (which may comprise a measured quantity of particulate merchandise material or a single unitary item or merchandise material which may be an integral merchandise item in itself or may be a hollow capsule or globule containing a desired type of merchandise material therein). The predetermined quantity of merchandise is fed downwardly into the merchandise-receiving cavity when it is positioned below the gravity-discharging bottom opening extending upwardly therefrom into the upper merchandise-storing chamber. Thus, the desired quantity of merchandise will be fed downwardly into said cavity, and the mere filling of the cavity will prevent the dispensing of any further quantity of the merchandise. Then the slide member is transversely moved outwardly into extended relationship relative to the slideway means, which will cause the measured quantity of merchandise in the cavity to be similarly moved outwardly into said extended relationship where it will now be located exterior of the base for removal by a user. In one preferred form where the merchandise material to be dispensed is of a particulate type, the cavity in the slide member may comprise a vertically directed through-hole in the slide member, with the bottom thereof being normally effectively closed by what might be termed auxiliary, bottom closure surface means which, in said particulate-merchandise-material dispensing form, may comprise a removable, downwardly-recessed, bottom closure, spoon-shaped member removably supported by the slide member with a downwardly recessed, spoon-bowl-shaped member lying within the cavity across and effectively temporarily closing lower portions thereof and thus being in a position to receive in the spoon-bowl-shaped member the particulate merchandise material when the slide member is in fully retracted position, and making it possible when the slide member is in fully extended position to merely lift the spoon-shaped member from its supported position on the slide member and to invert it and dump the particulate material into a receiving cup or the like.

When the merchandise material to be dispensed is of a unitary-merchandise-item type such as gum balls, or a two-part hollow globular plastic capsule carrying a merchandise item therein, the spoon-shaped member may be removed entirely from the slide member, which will leave the merchandise-receiving cavity in the slide member open at the bottom when it is in the extended position, but closed prior to that whenever it is in the retracted position within the base. This makes it possible to receive the merchandise item in the cavity and to then extend the slide member into fully extended relationship, which will also correspondingly move the merchandise item in the cavity to a position exterior of the base, thus effectively opening the bottom of the cavity and allowing the merchandise item to drop into a person's hand or any suitable merchandise receptacle.

While a preferred form of the invention comprises the features just referred to, it is also possible to make it of what might be termed a coin-operated or value-token-operated type requiring the insertion of a coin, or other value token, into a conventional coin mechanism, which is normally prevented from operating the slide dispenser until such a coin, or value-token, has been received, at which time it becomes effectively operable for causing (which also means, allowing the initiation of) a single extension and retraction of the slide member and the corresponding vending of a single desired quantity of merchandise. The slide member, when fully inserted provides a relatively effective seal for the bottom of the merchandise-storing chamber and, thus, prevents the undesired loss of any of the mechandise material and minimizes undesired deterioration thereof as a result of direct exposure to ambient atmosphere.

OBJECTS OF THE INVENTION

With the above points in mind, it is an object of the present invention to provide a novel slide dispenser apparatus for greatly simplifying and facilitating the dispensing of merchandise material, preferably of the particulate type such as coffee, tea, and the like, in a very simple, relatively inexpensive, and easy-to-operate apparatus capable of being widely used by inexperienced persons at places of work or wherever individuals may congregate for substantial periods of time.

It is a further object of the present invention to provide a novel slide action dispenser of the type referred to in the preceding object which is also capable of dispensing unitary merchandise items of various configurations and hollow globular capsule-type merchandise items (which are actually just carriers, with each containing therein one or more real merchandise items of a type so shaped as to otherwise be difficult to dispense in such a machine).

It is a further object of the present invention to provide a novel slide action dispenser which is of the character referred to herein, generically and/or specifically, and which may include any or all of the features referred to herein, either individually or in combination, and which is of extremely simple, inexpensive, easy-to-use, and easy-to-manufacture construction suitable for ready mass manufacture and distribution of the vending apparatus at an extremely low cost per unit, both as to the initial capital cost (including production set-up cost, etc.), and as to the subsequent per-unit manufacturing cost, whereby to be conducive to widespread production, distribution, sale, and use of the invention for purposes outlined herein or for any substantially equivalent or similar purposes.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, a first exemplary embodiment of the invention (employed, however, in two slightly different ways for dispensing two slightly different types of merchandise), and slight constructional variation, are illustrated in the herinbelow-described figures of the accompanying drawings, and are described in detail hereinafter.

BRIEF DESCRIPTION OF THE DRAWINGS

FIG. 1 is a reduced-size perspective view showing one exemplary form of the slide dispenser apparatus of the present invention is a fully assembled, upstanding, predispensing position ready for dispensing use.

FIG. 2 is a cross-sectional view taken substantially along the plane, and in the direction, indicated by the arrow 2—2 of FIG. 1, although drawn to a somewhat larger scale than FIG. 1. It shows the entire apparatus, and in particular the slide member thereof, in solid lines in a pre-dispensing position and in phantom lines in an extended position for dispensing a desired quantity of merchandis (in the example illustrated, merchandise of a particular type).

FIG. 3 is a top view, partly comprising a sectional view and partly comprising a top plan view, taken substantially along the plane and in the direction indicated by the arrows 3—3 of FIG. 2 and shows the apparatus with the slide member in solid lines in a fully retracted predispensing position and shows it in phantom lines in an extended position for manual dispensing of the measured quantity of particulate merchandise material in any desired manner such as, for example, as illustrated fragmentarily in the sequence of views comprising FIGS. 5, 6, and 7, although not specifically so limited.

FIG. 4 is a fragmentary, partially broken-away sectional view taken substantially along the plane, and in the direction, indicated by the arrows 4—4 of FIG. 2 and particularly illustrates the cross-sectional appearance of the exemplary intemediate merchandise-receiving-and-dispensing chamber, the manually extensible and retractable slide member slidably mounted in slideway means and provided with an upwardly directed, downwardly recesses merchandise-receiving cavity.

FIG. 5 is a fragmentary, partially elevational, and partly sectional view of aspect similar to the central portion of FIG. 2, but in this case shows the slide member in the fully extended position for the immediate subsequent manual dispensing of a desired measured quantity of particulate merchandise material in a manner such as is illustrated fragmentarily for exemplary purposes in FIGS. 6 and 7.

FIG. 6 is a fragmentary elevational view similar to a right portion of FIG. 5 and illustrates the next sequential step in the dispensing of a desired measured quantity of particulate merchandise material, comprising the removal of the spoon-shaped member (and the particulate material carried thereby) from its previously-received-and-mounted relationship with respect to the slide member for subsequent emptying of said particulate merchandise material into a desired receiver, such as a coffee cup, or the like, in the manner illustrated in FIG. 7.

FIG. 7 is a fragmentary view illustrating the next immediately succeeding step following the two sequential steps shown in FIGS. 5 and 6 and shows the inverting of the removed spoon-shaped member and the emptying of the vended or dispensed measured quantity of particulate merchandise material into a fragmentarily-shown receiver, illustrated in FIG. 7 as comprising a cup or mug, although not specifically so limited.

FIG. 8 is a side view of a spoon-bowl-shaped member, such as is shown in FIGS. 1–7 illustrating the invention used for the purpose of dispensing a predetermined measured quantity of a first type of merchandise material which is of particulate type, such as coffee, tea, cocoa, or the like, but with the size of the spoon-bowl-shaped member, or portion, thereof being reduced so as to be of smaller size suitable for the dispensing of a smaller measured quantity of such a particulate material than the spoon-bowl-shaped member, or portion, of the spoon-shaped member shown in FIGS. 1–7. It should be understood that the charge in size shown in FIG. 8 is a representative and exemplary only and the spoon-shaped member is not intended to be limited to the particular size shown for illustrative purposes only in FIG. 8 in longitudinal vertical-plane section. Actually, the showing of FIG. 8 intended to represent any of a great variety of different sizes of spoon-bowl-shaped member, or any substantial functional equivalent thereof.

FIG. 9 is a fragmentary view similar to the central portion of FIG. 2, but illustrates the slide dispenser apparatus used in a slightly different way for dispensing a slightly different type of merchandise, which in this case comprises a plurality of generally similar, substantially spherical, relatively large individual merchandise items (which is also intended to mean, a hollow container or capsule for an interior merchandise item or plurality of such). Therefore, the spoon-shaped member employed for dispensing merchandise of a particulate type, as shown in FIGS. 2–7 inclusive, is removed from the slide member as shown in FIG. 9 to allow the direct reception of a single merchandise item of a globular shape into the through-hole comprising the cavity-receiving recess in the slide member.

FIG. 10 is a fragmentary view similar to FIG. 5, but illustrates the dispensing of the alternate type of merchandise item of generally globular form as shown in FIG. 9 immediately after the full, manually-caused extension of the slide member, and, also after the immediately subsequent gravity-feeding of the single merchandise item through the bottom of the through-hole in the slide member into either a merchandise receptacle or the hand or a person operating the slide dispenser apparatus.

FIG. 11 is a greatly-reduced front elevational view of one slight modification of the invention wherein the slide dispenser apparatus is of the same construction as that illustrated in FIGS. 1–10 inclusive, but additionally includes a mechanism which controls the operation of the slide member so that a dispensing operation cannot occur until either a coin, or other value token, of a predetermined type is fed into a receiving slot of a conventional vending machine mechanism of any of a variety of types which effectively lock or de-couple the slide member at all times except after reception of the proper coin or other value token, at which time operation of the slide member is permitted for one merchandise-dispensing operation.

FIG. 12 is a fragmentary view of a central portion of a very slightly modified form of the apparatus wherein the mating portions of the upper part of the base and the lower part of the merchandise-storing chamber are slightly modified as to the construction and mode of attachment thereof.

FIG. 13 is a fragmentary view illustrating a slight modification of the FIG. 12 form and showing only as much of the structure as is necessary to understand the modification.

DESCRIPTION OF THE PREFERRED EMBODIMENTS

The exemplary first form of the invention comprises a merchandise dispenser base, one exemplary form of which is generally designated by the reference numeral 20. Said base is removably provided with a merchandise-storing chamber positioned directly thereover and having a bottom opening for merchandise gravity-feeding relationship with respect to the underlying merchandise dispenser base. In the exemplary first form of the invention illustrated, the merchandise-storing chamber is generally designated by the reference numeral 22 and the bottom opening referred to generically above comprises a hole, such as is indicated at 24, in a bottom-closing plate or panel 26 otherwise closing off the bottom of the merchandise-storing chamber 22. Preferably, the merchandise-storing chamber 22 is at least partially transparent to allow exterior viewing of merchandise stored therein, although not specifically so limited in all forms of the invention. In keeping with this concept, in the exemplary form of the invention illustrated, the merchandise-storing-chamber 22 is formed of substantially rectangularly arranged side wall portions, such as indicated at 28, integrally connected therearound so as to be substantially of parallelopiped shape terminating in a top opening, as indicated at 30, defined by a surrounding rectangular top edge 32 of the rectangularly arranged side wall portions 28, which are made of transparent plastic although in certain forms of the invention, glass or, more broadly speaking, any transparent material, suitably reinforced if desired, may be employed. Since it is desirable that the merchandise storing receptacle 22 be relatively unbreakable, it is desirable in the plastic-wall form thereof, that the plastic material employed be of a relatively non-frangible, resilient, substantially unbreakable nature. It should also be noted that the word "transparent", as used herein, is intended to have a very broad meaning including materials which are of substantially reduced transparency compared to the transparency of clear acrylic resin material of the kind commonly known as "Plexiglas" or transparency of the kind commonly found in clear glass. Indeed, said term is intended to include materials of reduced light transmission characteristics down to, and including, what might be referred to in a general way as translucent materials.

Several different plastic materials meet these requirements, including acrylic materials, high-impact polystyrene plastic materials, polyethylene plastic materials, and a preferred plastic material for this purpose comprises a polycarbonate plastic material of a kind commonly known in the trade as "Lexan", which is substantially unbreakable and yet extremely light-transmissive. Also, when glass is used, it may be of a high-impact resistance, substantially shatterproof or bullet-proof type glass or glass of the type commonly known as "Safety Glass" (such as glass-and-plastic laminated and/or heat-treated or tempered, constructions, or the functional equivalent thereof) in order to minimize the likelihood of breakage.

It should be clearly noted that the above indicates certain preferred materials for the walls of the merchandise-storing chamber 22 and a certain preferred shape thereof, but it should be clearly understood that it is not limited to being constructed of any of said representative materials specifically, but may be made of any suitable material, and it is also not necessarily limited to being of substantially parallelopiped shape.

In the example illustrated, the rectangular lower end of the interconnected side wall portions 28 of the merchandise-storing chamber 22 are integrally provided with an inwardly directed and inwardly convex neck portion 34 which terminates at the bottom in, and is transversely provided with, the previously-mentioned bottom-closing plate or panel 26, which effectively extends across and closes the complete bottom of the merchandise-storing chamber 22 except for the previously-mentioned bottom opening or hole 24 in said bottom plate or panel 26.

In the example illustrated, the merchandise dispenser base 20 is also of substantially rectangular, cross-sectional shape so as to define within its outer surface a substantially parallelopiped configuration similar to, but very likely smaller than, the parallelopiped configuration of the merchandise-storing chamber 22. In the exemplary form illustrated, said base 20 is made of metallic material which has several advantages in that it can be conveniently cast at relatively low cost, has substantial strength, and has sufficient weight to provide fairly stable support for the entire merchandise dispenser apparatus.

In the exemplary form illustrated, the cooperative engagement of the upper end of the base 20 and the lower end of the merchandise-storing chamber 22, for supporting said chamber 22 over said base 20, is illustrated in one exemplary form as comprising a rectangularly arranged engaging flange means lip portion 36 effectively integral with the top of the base 20 and of a rectangular size and shape exactly suitable to receive the rectangular lower edges of the interconnected side wall portions 28 of the merchandise-storing chamber 22 in the manner clearly shown in FIGS. 2, 4, 5, and 6. The flange lip portion 36 is provided with an inwardly curved and an inwardly convex supporting and interconnecting collar portion 38 integrally connecting the rectangularly arranged flange means lip portion 36 and a thickened portion 40 comprising the upper rectangular wall terminus of the main body portion of the base 20. The collar portion 38 is of a size and shape such as to exactly exteriorly mate with and engage the corresponding curved, inwardly directed and inwardly convex neck 34 integrally connected to the rectangularly arranged side wall portions 28 of the merchandise-storing chamber 22 as previously described. This provides large-surface-area contact and support between said rigid collar portions 38 carried at the top of the base 20 and completely surrounding the lower reduced-size neck portion 34 of the merchandise-storing chamber 22 in a manner which provides very positive and effective supporting engagement thereof by the base 20. For purposes of language correlation, the lower edges of the side wall portions 28 of the merchandise-storing chamber 22 and the inwardly curved neck portion 34 may be said to comprise a cooperable, downwardly directed edge-means-defining bottom portion of a correlated size suitable for firm mounting engagement with respect to the complete engaging means carried by the top of the base 20, with said engaging means of the base generally composite flange means including both of the elements 36 and 38.

A cover of cap member, indicated generally at 42, is provided in the exemplary first form of the invention and has a downwardly directed, substantially rectangularly arranged edge flange portion 44 of a size and shape such as to exactly encompass and receive therein the corresponding rectangularly arranged top edge portion 32 of the interconnected side wall portions 28 of the merchandise-storing chamber 22, whereby to positively close and seal the top opening 30 of the chamber 22 whenever the removable cap member 42 is in place. In the example illustrated, the cap member is made of cast metal, although not specifically so limited, and has a vertical tie rod 46 extending upwardly therethrough beyond the upper terminal surface 48 of the cap member 42, where said tie rod has an externally threaded upper end 50 for controllably threadedly engageable fastening engagement with respect to an internally threaded fastening nut 52. The lower end of the tie rod 46 is also externally threaded, as indicated at 54, for threaded engagement within an internally threaded fastening bass 56 attached for the bottom closure plate 26. Thus, it will be understood that it is relatively simple to remove the cap member 42 for replenishing merchandise within the hollow interior of the merchandise chamber 22, by merely unthreading the cap nut 52 and lifting the apertured cap member 42 from its normal closing position over the top opening 30. After replenishing the merchandise, the cap member 42 is replaced over the top opening 30 and the locking cap nut 52 is tightened into place, which will firmly vertically tie the entire assembly together.

The base 20 is provided with an intermediate merchandise-receiving-and-dispensing chamber positioned immediately below and in merchandise gravity-receiving relationship with respect to the bottom opening 24 in the bottom closing plate or wall 26 at the bottom of the merchandise-storing chamber 22. In the example illustrated (as is best shown in FIG. 5), said intermediate chamber is designated by the reference numeral 58 and is positioned immediately below the previously mentioned bottom closing panel or plate 26 at the bottom of the merchandise-storing chamber 22 and immediately above a lower transverse wall 60 extending between opposite walls 62 of the base 20. The bottom surface of the bottom panel or wall 26 closing the bottom of the merchandise-storing chamber 22 (except for the bottom hole 24), the downwardly spaced, fixed horizontal wall 60 of the base 20 and inside surfaces of two substantially-parallel, upstanding, transversely spaced, upper side wall surfaces, as best shown at 64 in FIG. 4, together effectively define what might be termed transversely directed slideway means effectively forming the walls of the previously-mentioned intermediate merchandise-receiving-and-dispensing chamber 58 (best shown in FIG. 5).

The dispenser also includes a substantially rectangularly cross-sectional-shaped slide member means generally designated by the reference numeral 66, which has a cross-sectional shape such as to exactly slidably fit into the transversely directed slideway means comprising the above-specified walls defining the limits of the previously-mentioned intermediate chamber 58, so that said slide member 66 is adapted to be slidably moved between a fully retracted pre-dispensing condition, such as is clearly shown in solid lines in FIGS. 1–4, inclusive, and a transversely extended dispensing position, such as is shown in phantom lines in FIGS. 2 and 3 and in solid lines in FIGS. 5 and 6, by merely manually grasping and operating a single engageable operating handle of hooked configuration, as indicated at 68, and manually pulling the slide member from the retracted pre-dispensing position into the fully-extended dispensing position. A fragment of such a finger digitally engaged with the slide handle 68 is shown fragmentarily in phantom at 70 in FIG. 5.

The extent of the outward extending movement is preferably limited so as to prevent the slide member 66 from being inadvertently pulled completely out of the slideway means defined by the intermediate chamber 58. In the example illustrated, such travel-limiting or stop means is indicated generally at 72 and comprises a downwardly directed stop pin 74 carried by the bottom of the slide member 66 near its rear end and slidably positioned in a groove 76 of limited extent terminating at a forward stop shoulder 78, which will thus limit the extent of the outward slidable movement of the slide member 66 when moved into the dispensing position most clearly shown in FIG. 5 wherein said stop pin 74 is shown in abutment with the stop shoulder 78.

The slide member 66 is provided with an upwardly directed, downwardly recesses merchandise-receiving cavity adapted to receive a predetermined quantity of merchandise fed downwardly thereinto under the action of gravity from within the hollow interior of the merchandise-storing chamber 22 through the bottom opening or hole 24 whenever said merchandise-receiving cavity is positioned directly under said bottom hole 24, which occurs when the slide member 66 is in the previously mentioned fully-retracted pre-dispensing position such as is most clearly shown in FIGS. 2 and 4. In said FIGS. 2 and 4, the merchandise-receiving cavity is generally designated by the reference numeral 80 and comprises a vertically directed through-hole 82 extending completely vertically through the slide member 66 from top to bottom thereof and at an appropriate location such as to directly underlie the bottom hole 24 in the bottom panel 26 when the slide member 66 is in the fully retracted pre-dispensing position most clearly shown in FIGS. 2–4.

The cavity 80 is effectively provided with auxiliary bottom surface closure means for normally effectively closing the bottom of the cavity 80 during slidable extension and retraction movement of the slide member 66, and the cavity 80, within the limits effectively defined by the base 20. This is for the purpose of positively retaining merchandise, received within the cavity 80 by way of the bottom hole 24 in the bottom panel 26, entirely within the cavity 80 during the slidable extension movement into an exterior dispensing position.

In the exemplary form of the invention illustrated in FIGS. 1 through 7, wherein it is adapted to dispense particulate merchandise material consisting of a number of discrete particles or granules, such as indicated generally in phantom lines at 84, the above-mentioned auxiliary bottom surface closure means is indicated generally as is best shown in FIGS. 6 and 7, and comprises a removable, downwardly recessed bottom closure, spoon-shaped member removably supported by the slide member 66 with a downwardly recessed spoon-bowl-shaped member or portion thereof, indicated at 86, lying within the cavity 80 across and effectively temporarily closing lower portions thereof so as to define an upwardly open, bottom closed, substantially semi-spherically, shaped receiver (effectively comprising said spoon-bowl-shaped member 86) lie directly under the bottom hole 24 in the bottom panel 26 for the direct, gravity-fed reception of a quantity of the particulate merchandise material 84 until the entire hollow interior of said spoon-bowl-shaped member 86 is filled to the top with such particulate merchandise material 84. When this occurs, no more gravity discharge of such particulate merchandise material through the hole 24 can occur and the filling of the member 86 ceases. Then, when the operating handle 68 is digitally grasped by a person's finger 70 and pulled into outwardly extended relationship such as is clearly shown in FIG. 5, the quantity of particulate merchandise material which has been previously received within the bowl-shaped member 86 will be transported into a position exterior of the base 20, as is clearly shown in FIG. 5, while the top surface 88 of the rest of the slide member 66 has effectively sealed and closed off the discharge hole 24. Then the next step is to digitally lift the entire spoon-shaped member 85 by a handle portion 90 thereof from its previously received position on top of the slide member 66 in the manner clearly shown in FIG. 6 and to then move it until the spoon-shaped member 85 overlies a suitable receptacle, such as the fragmentarily shown cup indicated at 92 in FIG. 7, at which time the spoon-shaped member 85 can be inverted, which will cause the particulate material, indicated very diagrammatically at 84 in FIG. 7, to be gravity-discharged into the interior of the cup or other receptacle 92. In the example illustrated, the upper surface of the slide member 66 is appropriately recesses at locations such as indicated at 94 to provide for the reception of the spoon-shaped member in a manner flush with the rest of the top surface of the slide member 66.

In the example illustrated, the attachment of the merchandise-storing chamber 22 with respect to the base 20 is further enhanced by the use of mechanical fastening means (screws in the example illustrated, although not specifically so limited), as indicated at 41, which connect four corner portions of the previously mentioned bottom panel 26 to upper portions of the base 20 at locations such as indicated at 43 (as best shown in FIGS. 3 and 4).

FIG. 8 illustrates in fragmentary, central, vertical-plane section a slightly modified form of the spoon-shaped member, indicated generally at 85 in the previous description, as is perhaps best shown in FIGS. 2 and 4–7 inclusive. Since this view illustrates a very slight modification of said spoon-shaped member, it will be designated by similar reference numerals, followed by the letter a, however, and it will be noted that the only difference in the spoon-shaped member 85a is in the spoon-bowl-shaped portion thereof, indicated at 86a, which is similar in volumetric capacity than the original spoon-bowl-shaped member 86 of the spoon-shaped member previously described. Indeed, a direct comparison of same, as shown in FIG. 8 and as shown in the adjacent FIG. 5, indicates clearly that the volumetric capacity of the modified spoon-bowl-shaped portion 86a is approximately one-half that of the first-described spoon-bowl-shaped member 86, as shown in FIG. 5, and thus it is ideal for dispensing a different predetermined quantity of the particulate merchandise material, such as that shown at 84 in FIG. 2 and previously described. It should be clearly understood that FIG. 8 is not intended to be limited to such a particular type of reduced-volume spoon-shaped member, but to any of a variety of different volumetric capacity sizes of same which may be selectively used according to the taste of a user or according to the strength and/or nature of the particulate material to be dispensed thereby, and the showing is intended to include both larger capacity and lesser spoon-shaped members and also to include the possibility of their being provided initially in separately usable form, or in initially nested form for separation and use of the proper size as desired or needed.

FIGS. 9 and 10 illustrate the same first exemplary form of the invention as illustrated in FIGS. 1–7 inclusive and as previously described in detail, but in the case of the showing of FIGS. 9 and 10, with a different type of merchandise indicated at 84' carried within the merchandise-storing chamber 22 and with a corresponding minor change in the so-called auxiliary bottom surface closure means which, in FIGS. 1–7, comprises the spoon-bowl-shaped portion or member 86 of the spoon-shaped member 85. In the FIGS. 9 and 10 showing, the merchandise 84' is in the form of a plurality of generally spherically-shaped objects, each one of which is indicated at 96 and which is illustrated in a form wherein it comprises a separable two-part capsule of generally globular shape, usually made of transparent plastic, which can carry an otherwise difficult-to-dispense merchandise item (or plurality of merchandise items) therein. The purpose of each such globular item 96 (which will hereinafter be referred to as merchandise or as a merchandise item) is to provide a convenient physical configuration for the interior merchandise. Also, it should be understood that generally spherical objects of a similar nature, such as gumballs, candy of the type commonly known as "jaw breakers", and the like, may also be substituted in lieu of the globular capsules 96 and are adapted to be dispensed in the same general manner by the apparatus as shown in FIGS. 9 and 10.

As illustrated in FIGS. 9 and 10, the auxiliary bottom surface closure means no longer comprises the spoon-bowl-shaped member 86 in the manner of the showing of FIGS. 1-7, since there is nothing in the through-hole 82 of a similar character. The effective auxiliary bottom surface closure means, in the showing of FIGS. 9 and 10, comprises the closed upper surface of the horizontal wall 60 carried by the base and which actually comprises the bottom wall of the previously mentioned slideway means which is co-extensive with the intermediate chamber 58 (best shown in FIG. 10). In other words, it will be understood that the globular merchandise item 96 will fall downwardly, under the action of gravity, through the hole 24 and into the cavity 80 and will rest upon the top surface of the horizontal wall 60 of the base 20, which will thus effectively comprise the auxiliary bottom surface closure means of the cavity 80 for retaining the merchandise item 96 therein during manually-caused, outward extending movement of the slide member 66 from the fully retracted position shown in FIG. 9 into the extended position shown in FIG. 10. Immediately after such a manually-caused slide member extending movement from the position of FIG. 9 into the position of FIG. 10, it will be noted that there is no longer any effective auxiliary bottom surface closure means underlying the now-open bottom of the through-hole 82 forming the cavity 80 and thus the globular merchandise item 96 it will be free for direct downward discharge through the open bottom of the through-hole 82 into any suitable receiver in the manner clearly shown in FIG. 10, in which example the receiver may be the hand of a person operating the slide member 66 for dispensing said merchandise item 96. However, any other suitable merchandise receptacle or receiver may be employed in lieu of such a hand.

FIG. 11 illustrates an identical slide action dispenser apparatus to that illustrated in FIGS. 1-7 (which is also equivalent to that illustrated in FIGS. 9 and 10 when the spoon-shaped member is removed) and, therefore, the interior details of this modification are not again illustrated or described. However, in view of the fact that it is a slight modification, all identical parts are designated by the use of corresponding reference numerals, followed by the letter b, however. The only new apparatus in the FIG. 11 modification, is the slide member controlling means, indicated generally at 98, which may be a conventional coin mechanism of any of a number of different types well-known in the art, with the word "coin" to be broadly interpreted as meaning an actual coin, or what might be termed a value-token which functions as the equivalent of an actual coin, which is adapted to be received in a conventional receiver slot 100, which will then effectively allow the representative operating handle 102 to become effectively operable with respect to the slide member, indicated generally at 66b, by means of any conventional interior type of "go" or "no go" coupling means which, being well-known in the art, is merely indicated diagrammatically by the broken coupling line 104 of FIG. 11. In other words, the arrangement is such in FIG. 11 that the slide member 66b cannot be operated in a merchandise-dispensing manner until a proper coin or token has been fed into the slot 100 and then the operating handle 102 has been operated to effectively release and/or to operate the slide member 66b for a single dispensing operation. Since such coin mechanisms are very well-known in the art, as are the coupling means for coupling same to the dispensing apparatus, it is believed that it would be redundant to repeat well-known prior art showings of such apparatus, which are merely indicated generally by the reference numerals 98, 100, 102, and 104 in FIG. 11.

FIG. 12 fragmentarily illustrates a very slight constructional modification of the first form of the invention in the region of the fastening attachment between the top of the base and the bottom of the merchandise-storing chamber, and fragmentarily shows a portion of such a modification located adjacent to the intermediate portion of FIG. 2 showing the first form of the invention. Because this view does illustrate a modification, parts which are structurally or functionally similar to corresponding parts of the first form of the invention, are designated by similar reference numeral, followed by the letter c, however.

In this modification, it will be noted that the major difference is the fact that the bottom-closing plate or panel member 26c no longer integrally attaches to the bottom of the merchandise-storing chamber 22c, but is separate therefrom and is preferably made of metal fastened in place by fastening screws 41c substantially identical to those shown at 41 in FIGS. 2, 3, and 4 of the first form of the invention. This means that the integrally threaded, central boss 56c is now made of metal and is integrally carried by said separate, but mechanically attached, bottom plate 26c, thus maximizing the strength of the vertical attachment of the bottom end of the tie-rod 46c thereto. This change is purely a constructional one for the purpose of maximizing the strength of the modification members just described, and otherwise does not change or affect the remainder of the structure and the mode of operation thereof.

FIG. 13 is a fragementary view very similar to at least a portion of FIG. 12, and illustrates a further very slight constructional variation thereof wherein corresponding parts are designated by similar reference numerals, followed by the d, however. In this modification, it will be noted that the bottom panel or plate 26d of the merchandise-storing chamber 22d is not only separate from the side wall portions thereof, but additionally it will be noted that the inwardly convex neck portion 34 previously attached to the bottom edge of the side wall portion of the merchandise-storing chamber in the first form of the invention, is eliminated entirely and the outer collar portion 38d and upwardly directed lip portion 36d which together may be said to comprise effective flange means carried at the top of the base 22d for engagement with the bottom edges of the side wall portions 28d of the merchandise-storing chamber, provide the only direct connection between the base 20d and the mechandise-storing chamber 22d. This configuration has all of the advantages of the FIG. 12 version, as to increased vertical connection strength, and also has the additional advantages of manufacturing simplification for the production of the merchandise-storing chamber 22d, which no longer carries a cost-increasing necked-down portion similar to that sown at 34 in the first form of the invention.

It should be understood that he figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

What is claimed is:

1. Slide dispenser apparatus taking the form of a manually operable, controlled-quantity merchandise dispenser, comprising: a merchandise dispenser base removably provided with a merchandise-storing chamber positioned directly thereover and having a bottom opening for merchandise gravity-feeding relationship with respect to the underlying merchandise dispenser base, said merchandise dispenser base having an upwardly open intermediate merchandise-receiving-and-dispensing-chamber positioned immediately below and in merchandise gravity-receiving relationship with respect to said bottom opening of said merchandise-storing chamber, said intermediate merchandise-receiving-and-dispensing chamber being provided with a manufally extendible and retractable merchandise-receiving-and-dispensing slide member and being provided with transversely directed slideway means slidably mounting said slide member for transverse slidable movement between a retracted inner position within said intermediate merchandise-receiving and dispensing chamber and a transversely extended dispensing position protruding to a substantial extent beyond an outside periphery of said base, said slide member being provided with an upwardly directed, downwardly recessed merchandise-receiving cavity adapted to receive a predetermined quantity of merchandise fed downwardly thereinto under the action of gravity from within said merchandise-storing chamber through said bottom opening and into said merchandise-receiving cavity, with said received merchandise lying entirely within said cavity whereby said transverse slidable extension movement of said slide member along said slideway means into said transversely extended relationship will move both said merchandise-receiving cavity and a desired quantity of merchandise transversely therewith into a position exterior of said base for removal and subsequent use by a person manually causing said transverse slidable extension of said slide member and said predetermined quantity of merchandise said slide member has a closed upper surface along the portion thereof which will be moved directly under said bottom opening of said merchandise-storing chamber during manual extension of said slide member so that, in effect, said closed top surface portion of said slide member will effectively seal and maintain in closed, sealed relationship said bottom opening during the entire slide member extension operation and during the succeeding slide member retration operation until it is fully retracted and said merchandise-receiving cavity is again directly under said bottom opening; said merchandise-receiving cavity comprises a vertically directed through-hole in said slide member, and including auxiliary bottom surface closure means for normally effectively closing the bottom of said merchandise-receiving cavity during slidable extension and retraction movement thereof within the limits effectively defined by said base.

2. Apparatus as defined in claim 1, wherein said auxiliary bottom surface closure means comprises a movable downwardly-recessed bottom closure spoon-shaped member removably supported by said slide member with a downwardly recessed spoon-bowl-shaped member lying within said cavity across and effectively temporarily closing lower portions thereof for the gravity reception of a predetermined measured quantity of merchandise when positioned directly under said bottom opening of said merchandise-storing chamber and for manual removal of the entire spoon-shaped member after transverse extension thereof along with said slide member into a position exterior of said base has occurred whereby to permit said spoon-bowl-shaped member carrying said predetermined measured quantity of merchandise to be manually removed from said slide member and said cavity for a desired type of usage by a person who has initiated dispensing extending operation of said slide member.

3. Apparatus as defined in claim 1, wherein said auxiliary bottom surface closure means comprises an effectively closed upper surface of said slideway means directly underlying the path of movement of said merchandise-receiving cavity of said slide member during slidable extension and retraction movement thereof within the limits defined by said base.

4. Apparatus as defined in claim 1, wherein said auxiliary bottom surface closure means comprises an effectively closed upper surface of said slideway means directly underlying the path of movement of said merchandise-receiving cavity of said slide member during slidable extension and retraction movement thereof within the limits defined by said base which, thus, effectively causes the opening of the bottom of said merchandise-receiving cavity when it is extended transversely outwardly beyond the limits defined by said base whereby to permit the downward gravity-discharging of a predetermined quantity of merchandise previously received within said cavity and transversely transported from within the interior of said base to a position exterior thereof during slidable outward extending movement of said slide member.

5. A dispensing device comprising: (a) a chamber having a bottom surface, said bottom surface having at least one hole therein; (b) a slide member, said slide member slidable in relationship to said bottom surface in a plane substantially parallel to the plane of said bottom surface between a first position and a second position; (c) said slide member having at least one opening therein, said opening aligning with at least a part of said hole in said bottom surface when in said first position whereby material contained in said chamber may fall into said opening and said opening not located below said bottom surface of said chamber when in said second position; (d) a spoon shaped member having an upwardly directed cavity therein and a handle means attached thereto, the cavity of said spoon shaped member removably fitting within said opening in said sliding member, said handle positioned whereby said handle is not below said bottom surface when said sliding member is in said second position.

6. The apparatus of claim 5 in which said opening in said sliding member passes through said sliding member.

7. The apparatus of claim 5 in which said opening in said sliding member passes only partially through said sliding member.

8. The apparatus of claim 5 in which said sliding member has a slot therein for receiving the handle of said spoon shaped member.

* * * * *

UNITED STATES PATENT OFFICE
CERTIFICATE OF CORRECTION

Patent No. 4,004,719                    Dated January 25, 1977

Inventor(s) Lane T. Weitzman

It is certified that error appears in the above-identified patent and that said Letters Patent are hereby corrected as shown below:

Col. 1, Line 53:   Last word, "or" should be "of" reading "item of"
Col. 3, Line 54:   Second word, "merchandis" should be "merchandise"
Col. 4, Line 3:    "intemediate" should be "intermediate"
Col. 4, Line 7:    "recesses" should be "recessed"
Col. 4, Line 47:   "charge" should be "change"
Col. 4, Line 48:   delete "a" after "Fig. 8 is"
Col. 4, Line 52:   insert "is" after "Fig. 8"
Col. 5, Line 11:   Fourth word, "or" second occurrence should be "of" reading "of a person"
Col. 7, Line 52:   "for" should be "to"
Col. 8, Line 54:   "recesses" should be "recessed"
Col. 9, Line 62:   "recesses" should be "recessed"
Col. 10, Line 17:  "similar" should be "smaller"
Col. 11, Line 28:  delete "it" after "item 96"
Col. 12, Line 60:  "sown" should be "shown"
Col. 12, Line 61:  "he" should be "the"
Col. 13, Line 18:  "fally" should be "ally"
Col. 13, Line 51:  "retration" should be "retraction"
Col. 7, line 32:   "Third word, "of" should be -- or --.

Signed and Sealed this

Twenty-sixth Day of April 1977

[SEAL]

Attest:

RUTH C. MASON
Attesting Officer

C. MARSHALL DANN
Commissioner of Patents and Trademarks